(12) United States Patent
Ishizaka

(10) Patent No.: US 7,616,843 B2
(45) Date of Patent: Nov. 10, 2009

(54) OPTICAL FUNCTIONAL DEVICE AND FABRICATION PROCESS OF THE SAME

(75) Inventor: Masashige Ishizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/644,840

(22) Filed: Dec. 26, 2006

(65) Prior Publication Data

US 2007/0147724 A1 Jun. 28, 2007

(30) Foreign Application Priority Data

Dec. 27, 2005 (JP) ............................. 2005-374605

(51) Int. Cl.
*G02F 1/035* (2006.01)
(52) U.S. Cl. .................. 385/2; 385/3; 385/8; 385/9
(58) Field of Classification Search .................. None
See application file for complete search history.

(56) References Cited

U.S. PATENT DOCUMENTS

| 6,341,184 | B1 * | 1/2002 | Ho et al. ............... | 385/3 |
| 6,744,845 | B2 * | 6/2004 | Harding et al. .......... | 378/16 |
| 6,907,156 | B1 | 6/2005 | Madsen | |
| 6,943,931 | B1 * | 9/2005 | Dingel ................ | 359/279 |
| 7,171,076 | B2 * | 1/2007 | Shibata ............... | 385/32 |

FOREIGN PATENT DOCUMENTS

JP 08-095108 4/1996
JP 2004-109097 4/2004

OTHER PUBLICATIONS

Ishizaka et al., "Modulator integrated DFB lasers with more than 600-km transmission capability at 2.5 Gb/s," *IEEE Photonics Technology Letters*, vol. 9, No. 10, Oct. 1997, pp. 1406-1408.
Liu et al., "Letters to Nature: A high-speed silicon optical modulator based on a metal-oxide-semiconductor capacitor," *Nature*, vol. 427, Feb. 12, 2004, pp. 615-618.
Sugiyama et al., "Compact zero-chip $LiNbO_3$ modulator for 10-Gb/s small-form-factor transponder," 2 pp.

* cited by examiner

*Primary Examiner*—Uyen Chau N Le
*Assistant Examiner*—Chad H Smith
(74) *Attorney, Agent, or Firm*—Young & Thompson

(57) ABSTRACT

Arranged for at least one of a pair of branch optical waveguides in a Mach-Zehnder type interference optical system is a ring resonance type phase shifter for modulating a light wave signal propagating through the branch optical waveguide. The ring resonance type phase shifter includes a ring-type optical waveguide arranged so as to be mode-coupled with the corresponding branch optical waveguide, and is configured so that amplitude branching ratio K between the corresponding branch optical waveguide and the ring-type optical waveguide can be varied with a change in refractive index or the like, accompanied by voltage application to a pn junction, for example. As amplitude branching ratio K is varied, the phase difference between the light wave signals propagating through the paired optical waveguides varies, to thereby control the intensity of the light wave signal output from the interference optical system.

14 Claims, 12 Drawing Sheets

OPTICAL FUNCTIONAL DEVICE AND FABRICATION PROCESS OF THE SAME

BACKGROUND OF THE INVENTION

1. Field of the Invention

The present invention relates to an optical functional device for use in optical communication, optical information processing, optical interconnections and the like, and in particular relating to an optical functional device such as an optical modulator for converting electric signals into optical signals, variable optical attenuator, and a driving method and a fabrication process of such optical functional devices.

2. Description of the Related Art

Optical functional devices or photonic devices, represented by an optical modulator which converts an electric signal as the modulation signal into an optical signal, an optical attenuator which attenuates an optical signal in accordance with an electric signal that represents the amount of attenuation, are key components that play markedly important roles in association with rapid increase in communication traffic on the recent optical communication market. With the development of optical communication technologies, these optical functional devices such as optical modulators, optical attenuators have been being developed into high performance and reduced cost products. As a result, studies on application of optical functional devices, not only to the optical communication field but also to the fields where a greater number of devices are required, typified by optical information processing, optical interconnections and the like have been started. The optical modulators and optical attenuators are essentially the same from the viewpoint that both change intensity of light wave in accordance with an electric signal though there is a difference in that an optical modulator changes the intensity of light wave at high speeds while an optical attenuator changes the intensity of light wave at low speeds. In this description, an optical modulator is taken as a representative of the optical functional devices. As the optical modulators, electroabsorption modulators using compound semiconductors, Mach-Zehnder type modulators using $LiNbO_3$ (lithium niobate) material have been put to practical use.

The Mach-Zehnder type optical modulator is based on the Mach-Zehnder interference optical system. The Mach-Zehnder interference optical system is essentially composed of an input optical waveguide for receiving a light wave signal, first and second waveguide portions, a splitter connected to the input optical waveguide for separating the light wave signal into two parts and propagating them to first and second waveguide portions, a wave combiner for recombining the light wave signals from the first and second waveguide portions, and an output optical waveguide for outputting the combined light wave signal. The Mach-Zehnder type optical modulator is constructed so as to be able to vary the intensity of the light at the output light, using the Mach-Zehnder type interference effect, by changing the phase difference between the light wave signals that propagate through the first and second waveguide portions.

Since the Mach-Zehnder type optical modulator operates based on the phase difference between the first and second waveguide portions, the intensity of the output light also changes in accordance with the wavelength if the wavelength of the input light is varied. Accordingly, there have been also proposed tunable filters (i.e., variable wavelength filters) and others that operate based on the Mach-Zehnder type modulator.

For example, Japanese Patent Application Laid-open No. H8-95108 (JP, 8-095108A) discloses an optical signal processor in which a plurality of unit structures, each including a ring-type waveguide mode-coupled with the first waveguide portion in the basic structure of the aforementioned Mach-Zehnder type interference optical system, are cascaded in multiple stages. In this optical signal processor, the unit structure to be cascaded is designed suitably so that it is possible to construct an optical filter having a desired characteristics. It is also possible to make the device have variable characteristics by providing a phase controller in the waveguide portion. However, in the device described in JP, 8-095108A, the device characteristics sharply change depending on the coupling coefficient (i.e., amplitude branching ratio) between the ring-type optical waveguide and the waveguide portion. Since this amplitude branching ratio greatly varies due to the influence of structural errors and other factors, it is difficult to fabricate and adjust the device so as to satisfy the desirable characteristics.

Japanese Patent Application Laid-open No. 2004-10297 (JP, 2004-010297A) discloses a tunable filter including, in the basic structure of the aforementioned Mach-Zehnder type interference optical system, a first ring-type optical waveguide mode-coupled with the first waveguide portion, and a second ring-type optical waveguide mode-coupled with the second waveguide portion. In this tunable filter, the indexes of refraction are varied by current injection or voltage application to the ring-type optical waveguides, or other method, so as to change the optical lengths of the ring-type optical waveguides, whereby the wavelength to be transmitted is changed. In general, the optical length is represented by a product of the physical length and the refractive index.

In the optical signal processor of JP, 8-095108A or in the tunable filter of JP, 2004-102097A, the intensity of the output light varies in accordance with the electric signal if the wavelength of the input light is constant.

As an example of electroabsorption modulators which use compound semiconductor, a modulator integrated light source using InP material has been disclosed by Ishizuka et al. [M. Ishizuka et al., "Modulator Integrated DFB Lasers with More Than 600-km Transmission Capability at 2.5 Gb/s," IEEE Photonics Technology Letters, Vol. 9, No. 10, pp. 1406-1408 (1997)]. This modulator integrated light source has been put into practical use as a light source for long-distance optical communication. As an example of Mach-Zehnder modulator using $LiNbO_3$ material, a miniaturized device has been particularly reported by Sugiyama et al. [M. Sugiyama et al., "Compact Zero-Chirp $LiNbO_3$ Modulator for 10-GB/s Small-Form-Factor Transponder," 30th European Conference on Optical Communication, Post-Deadline Session 3, Th4.3.5 (2004)]. However, the electroabsorption modulator proposed by Ishizuka et al. suffers from difficulties in reducing cost from the viewpoint of the used wafer material and fabrication cost. Though miniaturized, the Mach-Zehnder modulator proposed by Sugiyama et al. has a device size of 1 cm or greater, so there is a limit to reduce the cost.

A cheaply manufacturable optical modulator using Si semiconductor has been recently disclosed by Ansheng Liu et al. [Ansheng Liu et al., "A high-speed silicon optical modulator based on a metal-oxide-semiconductor capacitor," Nature, Vol. 427, pp. 615-618 (2004)]. The advantage of use of Si semiconductor resides in that, in addition to availability of matured processing techniques, there is a possibility of development into OEIC (optoelectronic integrated circuit) based on Si wafers, owing to the compatibility of Si with CMOS LSI technology. The optical modulator proposed by Liu et al. was revolutionary in the respect that not only passive optical waveguide portions but also active waveguide portions were formed on a Si wafer. However, the device configuration is to perform no more than conversion of the change in refractive index caused by application of an electric field to the vicinity of a PN junction into light intensity by use of a simple Mach-Zehnder interference optical system, and a device size equal to or greater than 1 cm is needed. So, there is not only a limit to cost reduction from the viewpoint of the yield obtained from one wafer when the device size is on the order of centimeters, but also it is difficult to develop an OEIC configuration by integrating the device with a CMOS LSI or the like. That is, there is the problem that the merit of use of Si semiconductor cannot be put to sufficient use.

Optical functional devices such as optical modulators, optical attenuators and the like are not only applied to the field of optical communication but application to the fields of optical information processing and optical interconnection have started to be discussed and studied. However, in order to make the optical functional devices widespread in the fields of optical information processing and optical interconnection, it is necessary for optical functional devices to endure mass production and it is also necessary to sharply cut off the fabrication cost. It is said that the fabrication cost of the products to be used in the fields of optical information processing and optical interconnection should be cut down two or more digits, compared to the products in the field of optical communication. In view of reducing fabrication cost, it is important to be able to manufacture a downsized device while maintaining the desired modulation characteristics or attenuation characteristics. Also, in order to make the device endure mass-production, it is desired that the characteristics of the device is little affected by structural variations.

However, in the aforementioned conventional optical functional devices, both the optical signal processor proposed by JP, 8-095108A and the tunable filter proposed by JP, 2004-102097A, a propagation delay of a light wave signal is caused by changing the refractive index of a waveguide through which the optical signal propagates so as to obtain variation in the intensity of the output light in accordance with the phase delay resulting from the propagation delay, based on the Mach-Zehnder interference effect. Accordingly, it is theoretically difficult to reduce the size of the conventional optical functional devices. Since largeness in size implies large parasitical electric capacitance, such optical functional devices are hard to operate at high speeds. Since the optical modulator using Si material, proposed by Liu et al. uses the matured semiconductor manufacturing technologies, the devices can be mass produced with stable characteristics; yet it is impossible to achieve downsizing, so there is a limit to cost reduction.

SUMMARY OF THE INVENTION

It is an object of the present invention to provide a Mach-Zehnder type optical functional device such as an optical modulator, optical attenuator or the like, which is able to solve the above-described problems and can be easily fabricated and adjusted, and which can also be cut down in device size and can operate at high speeds.

It is another object of the present invention to provide a driving method of an optical functional device of the present invention.

It is still another object of the present invention to provide a fabrication process of an optical functional device of the present invention.

The objects of the present invention are attained by an optical functional device comprising: an input optical waveguide for receiving input of a light wave signal; first and second branch optical waveguides; a splitter connected to the input optical waveguide to branch the light wave signal into two parts to be routed to the first and second branch optical waveguides; an optical modulating unit provided for, at least, one of the first and second branch optical waveguides to modulate the light wave signal that propagates through the corresponding branch optical waveguide for which the optical modulating unit is provided; a combiner for recombining the light wave signals from the first and second branch optical waveguides; and an output optical waveguide for outputting the combined light wave signal. The optical modulating unit comprises: a ring-type optical waveguide disposed so as to be optically coupled to the corresponding branch optical waveguide; and a means for varying the amplitude branching ratio between the corresponding branch optical waveguide and the ring-type optical waveguide.

In this optical functional device, by varying the amplitude branching ratio, the phase difference between the light wave signals propagating through the first and second branch optical waveguides is varied so as to control the intensity of the light wave signal emitted from the output optical waveguide. This optical functional device is suitable to be applied to an optical modulator, optical attenuator or optical switch, for example.

In the present invention, being optically coupled between the corresponding branch optical waveguide and a ring-type optical waveguide includes a case in which the cores of the two optical waveguides are arranged close to each other so that the optical waveguides are mode-coupled to each other and another case in which the two optical waveguides are connected by way of a coupler or the like so that a light wave signal may branch off one optical waveguide to the other and a light wave signal may branch off the other optical waveguide to one optical waveguide.

Since the optical functional device of the present invention uses a Mach-Zehnder type interference optical system, if a phase difference of $\Delta\phi$ takes place between the light wave signals that propagate through first and second branch optical waveguides, the output light intensity is given by $P \cdot \cos^2(\Delta\phi/2)$ for input light intensity P. Hence the output light will be attenuated or extinguished depending on phase difference $\Delta\phi$. Based on this, in this optical functional device, an optical modulating unit for modulating a light wave signal that propagates through the corresponding branch optical waveguide is provided for, at least, one of the first and second branch optical waveguides. The optical modulating unit includes a ring-type optical waveguide arranged so as to be optically coupled with the corresponding branch optical waveguide and a means for varying amplitude branching ratio K between the corresponding branch optical waveguide and the ring-type optical waveguide. In this configuration, since, as will be described later, it is possible to give a phase delay from 0 to approximately $\pi$ to the light wave signal passing through the optical modulating unit by varying amplitude branching ratio K within the range of $0 \leq K \leq 0.1$, it is possible to control the output light intensity by introducing such a phase delay to at least one of the branch optical waveguides by using the optical modulating unit.

Thus, in the optical functional device of the present invention, the functions of optical modulation, optical attenuation and optical switching can be realized by varying amplitude branching ratio K between the branch optical waveguide and ring-type optical waveguide in the optical modulating unit. Amplitude branching ratio K can be easily varied by changing the refractive indexes at the site where the branch optical waveguide and ring-type optical waveguide are optically coupled, for example. Since the area of this site is small hence the parasitic electric capacitance entailing this is also small.

Thus, according to the present invention, it is possible to obtain a downsized optical functional device capable of achieving high-speed operation without increase of the applied voltage and power consumption.

DETAILED DESCRIPTION OF THE PREFERRED EMBODIMENTS

First Embodiment

Figure 1:
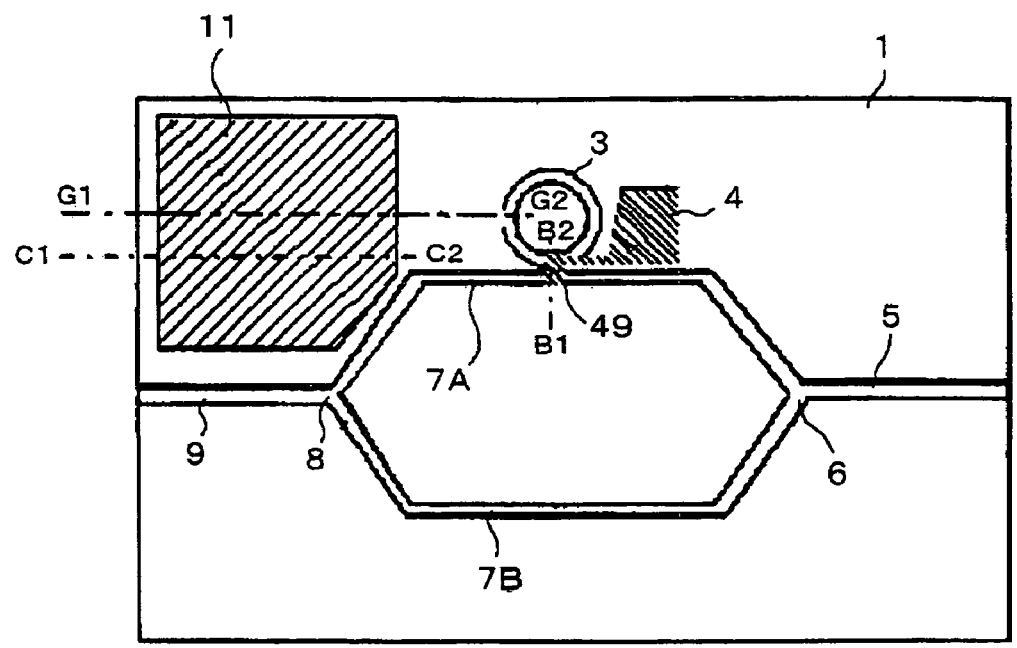
FIG. 1 is a schematic plan view showing a configuration of an optical modulator according to a first embodiment of the present invention.

FIG. 1 shows a configuration of an optical functional device according to the first embodiment of the present invention. Here, the optical functional device is given as a Mach-Zehnder type optical modulator.

Formed on one planar surface on top of silicon substrate 1 are input optical waveguide 9 which receives a light wave signal from its one end, splitter 8 connected to the other end of input optical waveguide 9, a pair of branch optical waveguides 7A, 7B, combiner 6 which combines light wave signals having passed through the two branch optical waveguides 7A, 7B, output optical waveguide 5 for outputting the light wave signal that was combined at combiner 6, and ring-type optical waveguide 3 to be mode-coupled with one branch optical waveguide 7A. Ring-type optical waveguide is arranged close to this branch optical waveguide 7A. Though in the figure, branch optical waveguides 7A, 7B are provided as linear configurations, these may be formed in curved shapes. Splitter 8 splits and routes the light wave signal that has propagated through input optical waveguide 9 into two branch optical waveguides 7A, 7B.

Figure 2:
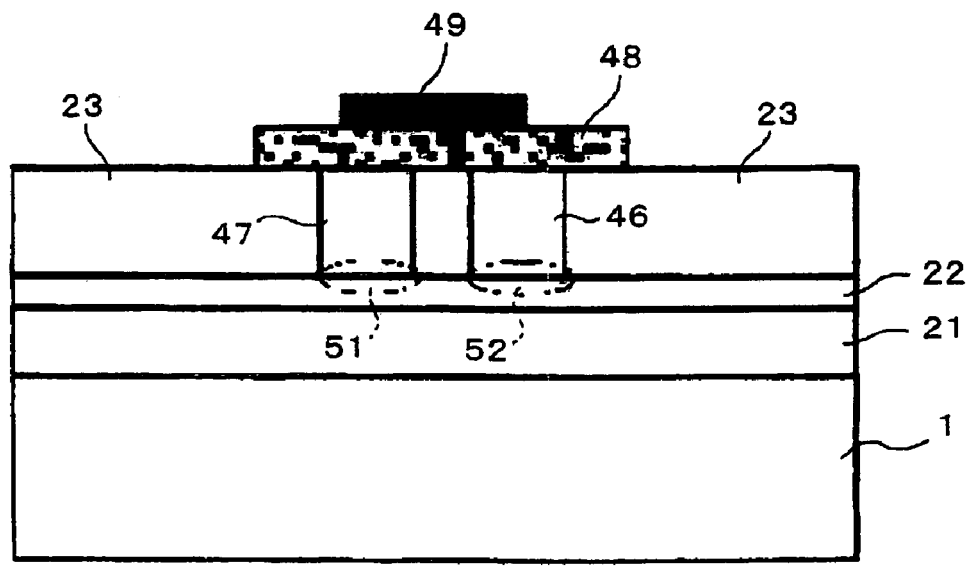
FIG. 2 is a sectional view, cut along line B1-B2 in FIG. 1.
Figure 3:
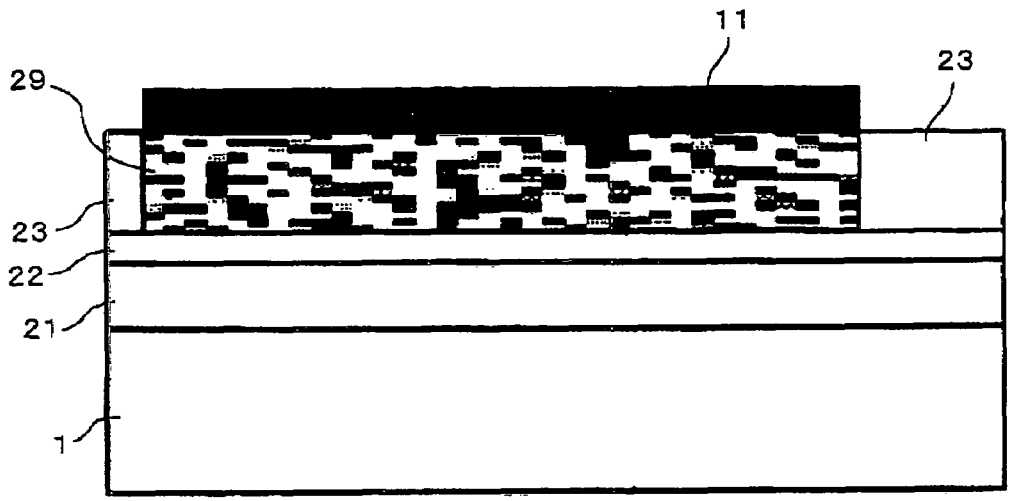
FIG. 3; a sectional view, cut along line C1-C2 in FIG. 1.

Each of optical waveguides 3, 5, 7A, 7B, 9, combiner 6 and splitter 8 is formed having an optical waveguide structure on silicon substrate 1. Now, this optical waveguide structure will be described. FIG. 2 shows B1-B2 section in FIG. 1. On silicon substrate 1, $SiO_2$ film 21 and n-type silicon layer 22 are formed successively. On the top of n-type silicon layer 22, ring-type optical waveguide 3 and branch optical waveguides 7A, 7B are formed as ridge-optical waveguides of p-type silicon. In the illustrated configuration, p-type silicon layer 46 corresponds to branch optical waveguide 7A and p-type silicon layer 47 corresponds to ring-type optical waveguide 3. Formed in the areas where the light wave intensity concentrates are pn junctions 51, 52 formed between n-type silicon layer 22 and p-type silicon layers 46, 47. Both sides of p-type silicon layers 46, 47 are filled with $SiO_2$ film 23. Further, p-type polysilicon layer 48 and cathode electrode 49 for voltage application are successively formed in layers over p-type silicon layers 46, 47. Pad electrode 4 is formed on and electrically connected to cathode electrode 49. FIG. 3 shows C1-C2 section in FIG. 1. N-type polysilicon layer 29 and anode electrode 11 for voltage application are successively laminated over part of n-type silicon layer 22. Though not illustrated, input optical waveguide 9, splitter 8, branch optical waveguide 7B, combiner 6 and output optical waveguide 5 are also constructed as ridge optical waveguides of a p-type silicon layer.

In this optical functional device, the structure of the waveguide portion that contributes to interaction is determined as an example so that the length of the waveguide portion that optically couples branch optical waveguide 7A and ring-type optical waveguide 3 to cause interaction with one another, namely interaction length, is set at 100 μm and the mode coupling constant between the two optical waveguides is equal to $1 \times 10^{-3}$ rad/μm.

Next, the operating mechanism of the optical functional device according to the present embodiment will be described in detail. A light wave fed to input optical waveguide 9 is separated into two parts by splitter 8 and routed to propagate through branch optical waveguides 7A, 7B. Because optical waveguide 7A and ring-type optical waveguide 3 are mode-coupled, the light wave having passed through optical waveguide 7A also branches into ring-type optical waveguide 3. When the amplitude of the light wave having passed through optical waveguide 7A is represented as |a| and the amplitude of the light wave that branches from optical waveguide 7A into ring-type optical waveguide 3 is represented as |c| the amplitude branching ratio K is given as |c|/|a|, where $0 \leq K \leq 1$ holds. When k represents the coupling constant of mode coupling between ring-type optical waveguide 3 and branch optical waveguide 7A and l represents the optical path length of the portion contributing to mode coupling, K is represented as K=sin (kl).

Figure 4:
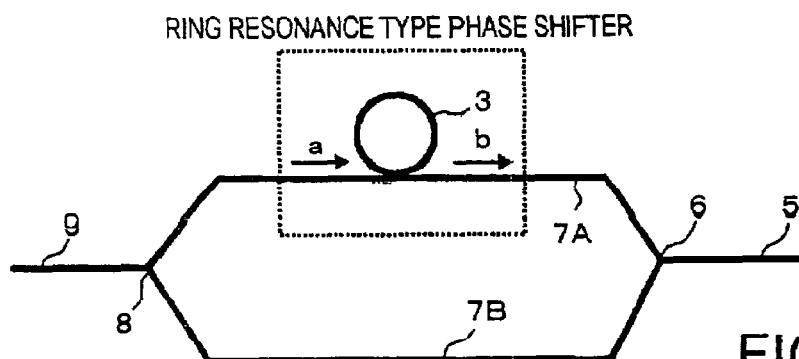
FIG. 4 is a view for illustrating the operation principle of a ring resonance type phase shifter.

The light wave component that has branched into ring-type optical waveguide 3 also finally returns to branch optical waveguide 7A. However, because ring-type optical waveguide 3 has a finite length L, a phase delay resultantly takes place when the input to, and output from, branch optical waveguide 7A, are focused on. On the other hand, the strength of the mode coupling between branch optical waveguide 7A and ring-type optical waveguide 3 can be represented with the aforementioned amplitude branching ratio K. For this reason, the system made of branch optical waveguide 7A and ring-type optical waveguide 3 that is mode-coupled therewith will be called a ring resonance type phase shifter. FIG. 4 conceptually illustrates the ring resonance type phase shifter.

Here, "a" represents the amplitude of the light wave that is incident on optical waveguide 7A at its one end and "b" represents the amplitude of the light wave that is outgoing from the other end of optical waveguide 7A, b can be given as Eq. (1) using a when both a and b are assumed to be expressed in complex representation:

$$b = \frac{e^{j\beta L} \cdot \sqrt{1-K^2} - 1}{e^{j\beta L} - \sqrt{1-K^2}} \cdot a \quad (1)$$

$$\text{where } \beta L = \frac{2\pi}{\lambda} \cdot n_{\text{eff}} \cdot L.$$

Here, π is pi (the ratio of circumference to the diameter of a circle), λ is the wavelength of the incident light wave, $n_{\text{eff}}$ is the effective refractive index of the ring-type optical waveguide, L is the circumference of the ring of the ring-type optical waveguide. In Eq. (1), β L represents the phase delay in radian when a light wave with wavelength of λ makes one round along the ring-type optical waveguide. Since phase difference Δφ between incident light a and outgoing light b can be represented by the argument of the complex ratio between light wave amplitudes a and b, it is given as follows:

$$\Delta\phi = \text{Arg}\left[\frac{b}{a}\right] = \tan^{-1}\left[\frac{K^2 \cdot \sin(\beta L)}{2\sqrt{1-K^2} - (2-K^2) \cdot \cos(\beta L)}\right] \quad (2)$$

As already mentioned, amplitude branching ratio K satisfies the relation $0 \leq K \leq 1$.

Figure 5:
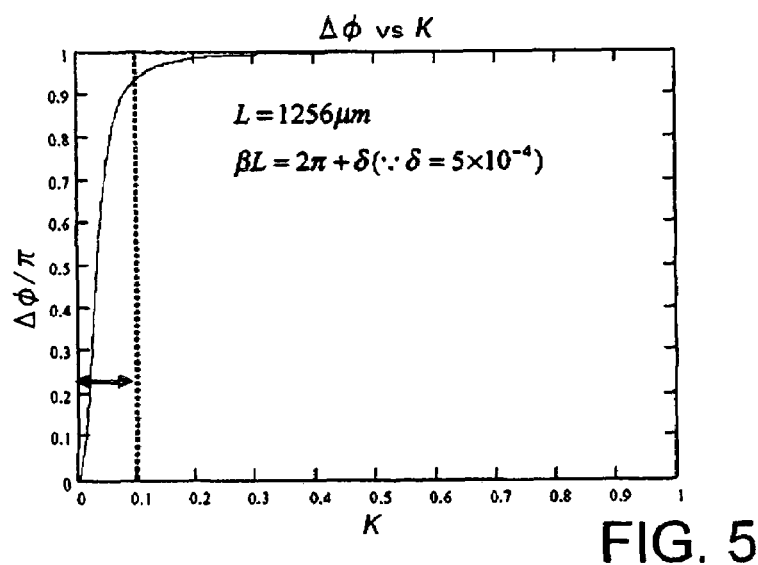
FIG. 5 is a graph showing the relationship between amplitude branching ratio K and phase difference $\Delta\phi$.

As apparent from Eq. (2), phase difference Δφ can be varied by changing amplitude branching ratio K. FIG. 5 shows the relationship between amplitude branching ratio K and phase difference Δφ when ring-type optical waveguide 3 of a perfect circle having a radius of 200 μm (ring circumference L=1.256 mm) is used. Ring circumference L of ring-type optical waveguide 3 is approximately equal to an integer multiple of the wavelength of the incident light to the ring-type optical waveguide, as represented with "2π" of the first term on the right side of the equation of βL in FIG. 5. However, more accurately, ring circumference L is slightly greater than an integer multiple of the wavelength; therefore, ring-type optical waveguide 3, when the incident light makes one round, will produces a phase delay of $5 \times 10^{-4}$ radian other than the term of an integer multiple of the wavelength. In the graph of FIG. 5, the phase difference Δφ on the vertical axis is normalized by π. As apparent from this graph, it is possible to perform phase modulation approximately from 0 to π when amplitude branching ratio K is varied within the range of about 0<K<0.1.

Returning to FIGS. 1 to 3, when a voltage is applied between cathode electrode 49 and anode electrode 11, the potential of the n-type silicon layer varies so that the depletion layers at pn junctions 51, 52 become large and the refractive indexes of the areas around these pn junctions 51, 52 vary by plasma effect. This change in refractive indexes causes a change across sectional electromagnetic field distribution of the light waves in ring-type optical waveguide 3 and branch optical waveguide 7A. As a result, amplitude branching ratio K between the two optical waveguides varies, so does phase difference Δφ.

In optical modulator of the present embodiment, the input light wave signal that is incident from incident light waveguide 9 is branched by splitter 8 and distributed to paired branch optical waveguides 7A, 7B. The light wave signal routed through branch optical waveguide 7B is incident on combiner 6 without phase delay, whereas the light wave signal routed through branch optical waveguide 7A undergoes variable phase delay ranging from 0 to π by the ring resonance type phase shifter with ring-type optical waveguide 3 and then enters combiner 6 (i.e., combining waveguide portion). The phase delay herein depends on the voltage applied between cathode electrode 49 and anode electrode 11. The intensity of the light wave signal that has been combined at and emitted from combiner 6 varies depending on the phase delay through branch optical waveguide 7A due to the Mach-Zehnder type interference effect at combiner 6. As a result, it is possible to change the intensity of the light wave signal emitted from combiner 6 and passing through output optical waveguide 5, by varying the applied voltage between cathode electrode 49 and anode electrode 11, i.e., the modulation signal hence changing the aforementioned amplitude branching ratio K. Thus it is possible to perform modulation of light wave signals. Here, as a matter of course, the optical modulator of the present embodiment can be also used as an optical attenuator that attenuates the intensity of the output light in accordance with the voltage applied between cathode electrode 49 and anode electrode 11 as well as an optical switch.

In this embodiment, in order to vary amplitude branching ratio K, the refractive indexes of ring-type optical waveguide 3 and branch optical waveguide 7A are caused to vary by applying a voltage to cathode electrode 49 that is arranged in the area where ring-type optical waveguide 3 and branch optical waveguide 7A close to each other so as to connect optical waveguides 3, 7A. However, if the refractive index of either one of the optical waveguides is varied, the transmission mode of the light wave signal that propagates through the optical waveguide changes. As a result the coupling state between the two optical waveguides 3, 7A also changes. Accordingly, the optical modulator of the present embodiment may be constructed such that cathode electrode 49 is arranged over one of ring-type optical waveguide 3 and branch optical waveguide 7A only so as to be able to apply voltage to the corresponding optical waveguide alone.

In the optical modulator of the present embodiment, it is possible to achieve optical intensity modulation substantially 100 percent by varying amplitude branching ratio K from 0 to 0.1 only. In order to vary amplitude breaching ratio K to the extent as mentioned above, a relatively low voltage is enough to be applied between cathode electrode 49 and anode electrode 11. Further, since what the electrode for varying amplitude branching ratio K needs is to be able to apply a voltage to the portion where the ring-type optical waveguide and branch optical waveguide are mode-coupled, it can be formed in a smaller size compared to the electrode to be used for varying the optical length of an optical waveguide, therefore parasitic electric capacitance of the electrode can also be made small. As a result of these features, according to the present embodiment, it is possible to construct an optical modulator which is able to perform high-speed modulation with a lower power consumption compared to the conventional configuration. Further, since the electrode can be made small in size, according to the present embodiment it is possible to form a miniature optical modulator, hence the occupied area of a single optical modulator on the silicon substrate can be made small, thus it is possible to reduce the manufacturing cost of optical modulators.

In the optical signal processor disclosed in JP, 8-095108A, due to variations in manufacturing and the like, the degree of the optical coupling between the ring-type optical waveguide and one of the two optical branch waveguides through which one branch of the light wave signal divided in two parts by the splitter propagates varies, so that it is difficult to obtain the desired characteristics. In contrast to this, the optical modulator of the present embodiment is adapted to perform modulation by changing directly the degree of the optical coupling between the branch optical waveguide and the ring-type optical waveguide, it is possible to easily compensate for the variations in manufacturing by feeding back the modulation result. Thus, the fabrication and adjustment of the optical modulator itself can be made simple in accordance with the present embodiment.

Though in the above configuration, plasma effect in the pn junctions is used to vary amplitude branching ratio K, as is apparent to those skilled in the art, it is possible to provide pin junctions instead of pn junctions, so that plasma effect at the pin junctions may be utilized. When pin junctions are used, an i-type silicon layer is formed between n-type silicon layer 22, and p-type silicon layers 46, 47. In this case, the i-type silicon layer may be formed in the positions directly below p-type silicon layers 46, 47 alone or may be formed throughout the top of n-type silicon layer 22.

Figure 6:
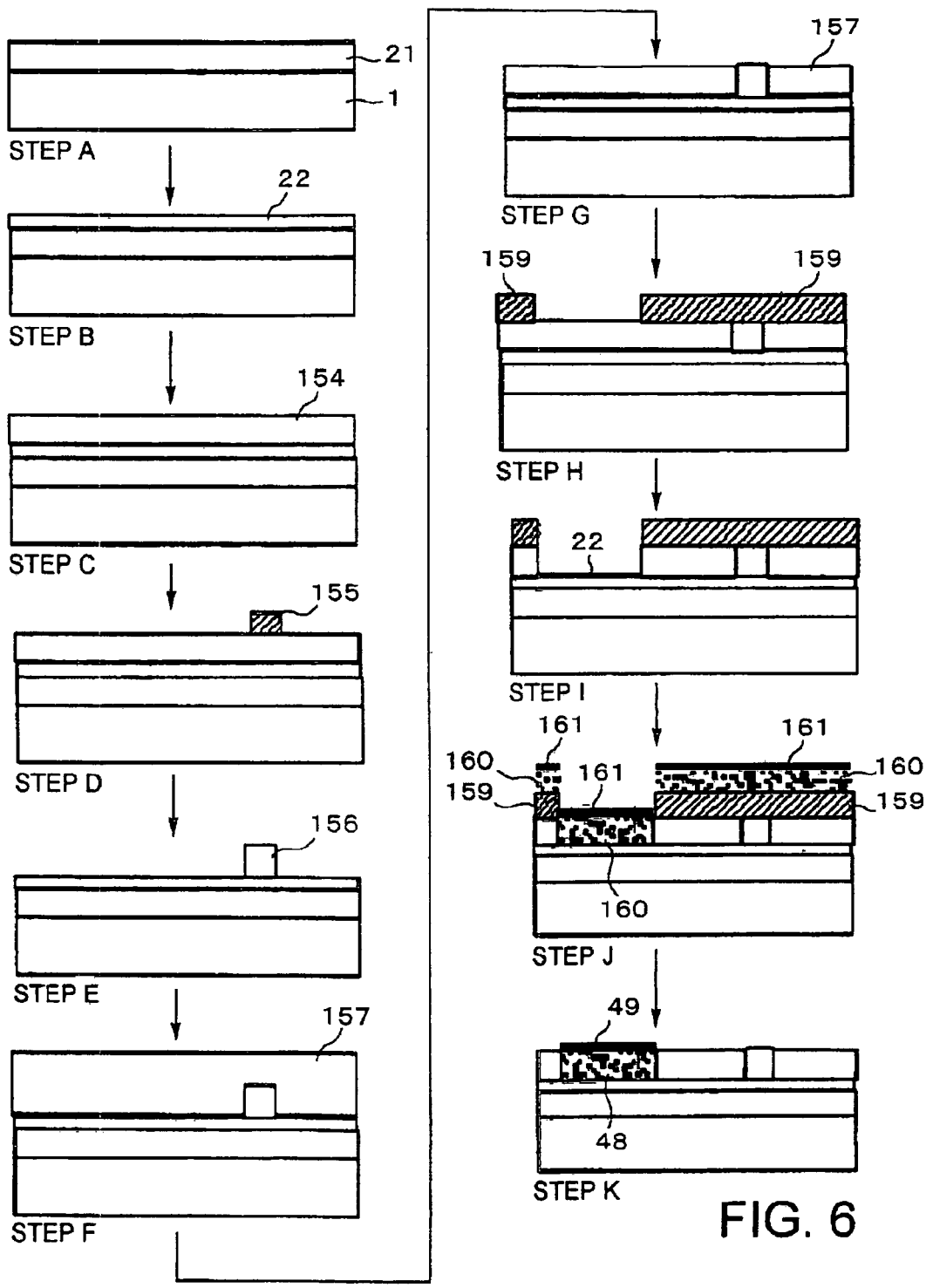
FIG. 6 is a view showing a method of manufacturing the optical modulator of the first embodiment.

Next, the fabrication process of the optical modulator shown in FIG. 1 will be explained. FIG. 6 shows sequential manufacturing steps of the optical modulator of the first embodiment, by depicting the sections corresponding to that cut along line G1-G2 in FIG. 1.

To begin with, at Step A, an SOI substrate that is silicon substrate 1 on which $SiO_2$ layer 21 is laminated is used. At Step B, n-type silicon layer 22 is laminated on the upper surface of the SOI substrate. At Step C, p-type silicon layer 154 is formed over n-type silicon layer 22 and optical waveguide pattern 155 is formed on the upper surface of p-type silicon layer 154 by ordinary exposure step (Step D) using a photosensitive resist film. Then, p-type silicon layer 154 masked by optical waveguide pattern 155 (i.e., resist pattern) is etched using an RIE (reactive ion etching) process so as to form p-type ridge waveguide 156, that is, p-type silicon layer 47, to be ring-type optical waveguide 3. Though not illustrated in the drawing, ridge waveguides to be branch optical waveguides 7A, 7B are also formed at the same time.

Thereafter, at Step E, optical waveguide pattern 155 is removed, and $SiO_2$ film 157 is laminated over n-type silicon layer 22 and p-type silicon layer 47 at Step F. At Step G, the whole of $SiO_2$ film 157 is uniformly etched by an RIE process until the top portion of p-type ridge optical waveguide is exposed. Then resist mask pattern 159 for forming anode electrode 11 is formed. At Step I, $SiO_2$ film 157 masked with resist mask pattern 159 is uniformly etched by an RIE process until a portion of n-type silicon layer 22 is exposed. Then, at Step J, n-type polysilicon layer 160 and metal electrode layer 161 are laminated over n-type silicon layer 22 and resist mask pattern 159. At Step K, a lift-off process for removing resist mask pattern 159 with an organic solvent or the like is performed to form n-type polysilicon layer 29 and anode electrode 11. Thereafter, p-type polysilicon layer 48 and cathode electrode 49 are formed by typical photolithography, to complete an optical modulator of the first embodiment.

P-type polysilicon layer 48 and cathode electrode 49 can be formed by, for example, forming a resist mask pattern for forming cathode electrode 49, laminating a p-type polysilicon layer and a metal electrode over this resist mask pattern, then removing the resist mask pattern by a lift-off process.

Second Embodiment

Figure 7:
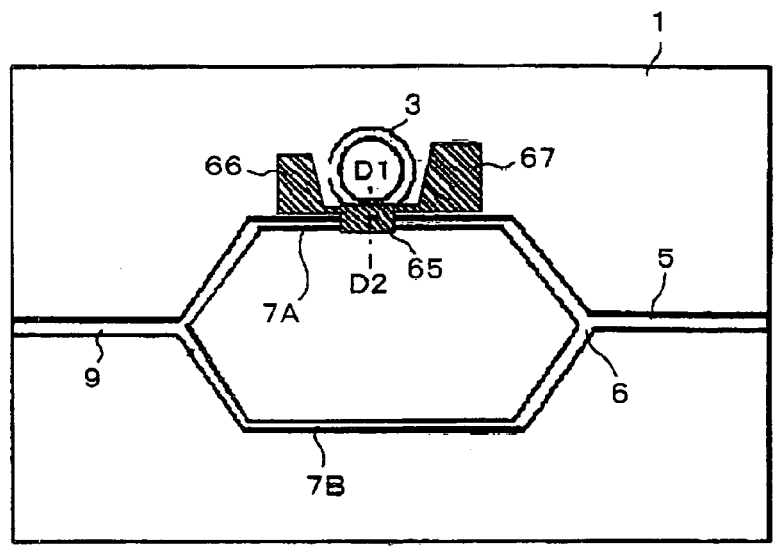
FIG. 7 is a schematic plan view showing a configuration of an optical attenuator according to a second embodiment of the present invention.
Figure 8:
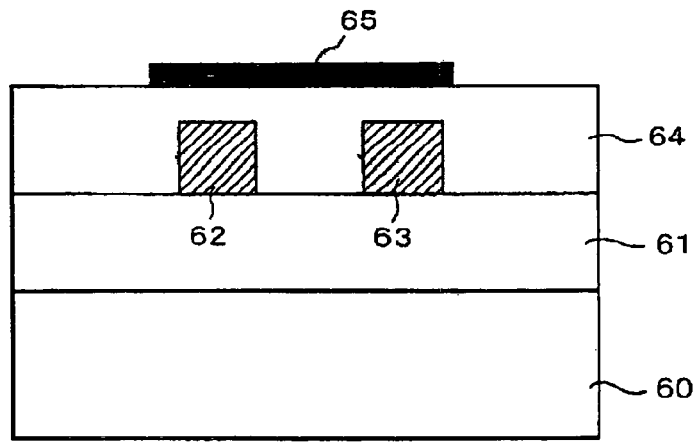
FIG. 8 is a sectional view, cut along line D1-D2 in FIG. 7.

Next, as the second embodiment of the present invention, a Mach-Zehnder type optical attenuator that will operate with low power consumption will be described. FIG. 7 shows an optical attenuator according to the second embodiment. FIG. 8 shows the section cut along line D1-D2 in FIG. 7. In FIGS. 7 and 8, the same components as those shown in FIGS. 1 to 3 are allotted with the same reference numerals.

Similarly to the optical modulator of the first embodiment, this optical attenuator uses a ring resonance type phase shifter made up of ring-type optical waveguide 3 and branch optical waveguide 7A. Amplitude branching ratio K between ring-type optical waveguide 3 and branch optical waveguide 7A is controlled so as to vary the intensity of the light wave signal emitted from output optical waveguide 5. Here in this embodiment, heater 65 is arranged at the site where ring-type optical waveguide 3 and branch optical waveguide 7A are mode-coupled, and a change in temperature is caused by energizing this heater to generate heat so as to vary the refractive indexes of optical waveguides 3, 7A in the position where ring-type optical waveguide 3 and branch optical waveguide 7A are mode-coupled. With the change of the refractive indexes caused by change in temperature, the sectional electromagnetic field distribution of the light waves in ring-type optical waveguide 3 and branch optical waveguide 7A changes, so that amplitude branching ratio K between the two optical waveguides varies. Accordingly, as amplitude branching ratio K is varied by changing the power input to heater 65, the degree of the phase delay of the light wave signal in branch optical waveguide 7A varies, so as to cause change in the intensity of the light wave signal emitted from output optical waveguide 5. The power input to heater 65 may and should be determined in accordance with the amount of attenuation that is wanted from this optical attenuator. Pad electrodes 66, 67 for supplying current to heat 65 are also formed on the surface of the optical attenuator.

In the present embodiment, since amplitude branching ratio K is varied in accordance with the change in refractive indexes as a result of temperature change, the response time constant is at most some tens of milliseconds. Accordingly, though this configuration is unsuitable for the optical modulator for performing high-speed modulation of a light wave signal in accordance with a modulation signal, it can be used as an optical attenuator (alternatively, optical switch) that operates at rather high speed, i.e., some tens of milliseconds, as an attenuator and switch. Further, if the modulation signal is extremely low in speed, this can be also used as an optical modulator. Though there is a difference in operation between the first and second embodiments, that is, the former uses plasma effect at pn junctions to vary amplitude branching ratio K and the latter uses change in refractive indexes caused by temperature change to vary the amplitude branching ratio, the operational principle other than this is the same as that of the first embodiment.

Here, in this embodiment, in order to vary amplitude branching ratio K, the refractive indexes of ring-type optical waveguide 3 and branch optical waveguide 7A are caused to vary by energizing heater 65 that is arranged in the area where ring-type optical waveguide 3 and branch optical waveguide 7A are located close to each other, covering both optical waveguides 3, 7A so as to change the both optical waveguides 3, 7A in temperature. However, if the refractive index of either one of the optical waveguides is varied, the transmission mode of the light wave signal that propagates through the optical waveguide changes, hence the coupling state between the two optical waveguides 3, 7A also changes. Accordingly, the optical modulator of the present embodiment may be constructed such that heater 65 is arranged over one of ring-type optical waveguide 3 and branch optical waveguide 7A only so as to be able to heat the corresponding optical waveguide alone.

The sectional structure of this optical attenuator will be described. $SiO_2$ clad layer 61 is laminated over silicon substrate 60. SiON core layers 62, 63 are formed on portions of the upper surface of $SiO_2$ clad layer 61. Further, $SiO_2$ clad layer 64 is provided so as to cover these $SiO_2$ clad layer 61 and SiON core layers 62, 63. SiON core layers 62, 63 correspond to branch optical waveguide 7A and ring-type optical waveguide 3, respectively. In the position where SiON core layers 62, 63 are mode-coupled, in other words, in the position where branch optical waveguide 7A and ring-type optical waveguide 3 are mode-coupled, heater 65 is formed on the surface of $SiO_2$ clad layer 64. Pad electrodes 66, 67 for current input are connected to heater 65. Though not illustrated herein, input optical waveguide 9, splitter 8, branch optical waveguide 7B, combiner 6 and output optical waveguide 5 are also formed of the $SiO_2$ clad layers and the SiON core layer.

In this optical attenuator, heater 65 is Joule-heated by applying a voltage between pad electrodes 65, 66. As a result, SiON core layers 62, 63 as well as $SiO_2$ clad layer 64 adjacent to them are elevated in temperature, so that these layers 62 to 64 varies in refractive index by thermal-optical effect. Resultantly, amplitude branching ratio K changes so that it is possible to vary the output light intensity, following the same principle as in the case of the first embodiment. In the present embodiment, since the device will work only if the area where branch optical waveguide 7A and ring-type optical waveguide 3 are mode-coupled is heated, it is possible to make the heater area small and to reduce the power to be supplied to heater 65, hence realizing a low power consumption configuration. Naturally, since the heat value changes in accordance with the power supplied to heater 65 and amplitude branching ratio K also changes with this, it is possible to realize a variable optical attenuator whose attenuation ratio can be set arbitrarily In the present embodiment, since the device will work only if the area where ring-type optical waveguide 3 and branch optical waveguide 7A are mode-coupled is varied in temperature, the power used for the heater can be drastically cut down, compared to the conventional optical attenuator in which, for example, the whole of the ring-type optical waveguide or the whole of one of the branch optical waveguides needs to be varied in temperature. Further, since the heat capacity of the portion where the temperature needs to be varied is low, high-speed operation is made possible.

Since the optical attenuator of the present embodiment operates in accordance with the change in refractive indexes of ring-type optical waveguide 3 and branch optical waveguide 7A accompanied by change in temperature, for example a quartz optical waveguide structure formed on the silicon substrate can be used as an optical waveguide. Thus, according to the present embodiment, it is possible to fabricate an optical attenuator or optical switch having an operating speed as high as some tens of milliseconds, by a simple process at low cost. Further, when a quartz optical waveguide structure is employed, the device can also be operated with a light wave having a shorter wavelength such as a visible light, in contrast to the case where silicon optical waveguides are employed.

Third Embodiment

Figure 9:
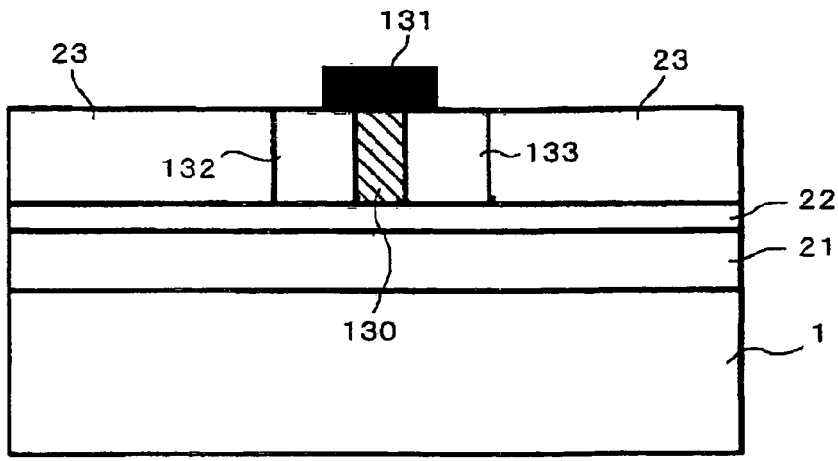
FIG. 9 is a schematic plan view showing a configuration of an optical modulator according to a third embodiment of the present invention.

Next, an optical modulator according to the third embodiment of the present invention will be described. FIG. 9 shows an optical modulator of the third embodiment. This optical waveguide has a similar configuration to the optical modulator of the first embodiment, and FIG. 9 corresponds to the section cut along line B1-B2 in FIG. 1. However, in the optical modulator of the present embodiment, in order to make amplitude branching ratio K between branch optical waveguide 7A and ring-type optical waveguide 3 variable, EO effect layer (i.e., electro-optic effect device) 130 made up of a material having electro-optic effect is arranged in the area between the cores of optical waveguides 3, 7A in the area where branch optical waveguide 7A and ring-type optical waveguide 3 are mode-coupled. Since in this optical modulator, the magnitude of the EO effect varies in accordance with the voltage applied to EO effect layer 130, it is possible to vary the coupled state between the two optical waveguides 3, 7A in accordance with the applied voltage, hence it is possible to vary amplitude branching ratio K between the two optical waveguides 3, 7A. EO effect layer 130 is formed of, for example, $LiNbO_3$ and the like. EO effect layer 130 is so formed that its undersurface is in contact with n-type silicon layer 22 and an electrode 131 is formed on the upper surface. As the cores of both optical waveguides 3, 7A, electrically insulative $SiO_2$ core layers 132, 133 are provided instead of the p-type silicon layer. Though not illustrated, input optical waveguide 9, splitter 8, branch optical waveguide 7B, combiner 6 and output optical waveguide 5 also use $SiO_2$ as their cores.

In this optical modulator, a voltage is applied between electrode 131 and anode electrode 11 (see FIG. 1) so as to apply the voltage to EO effect layer 130. Control of voltage application to EO effect layer 130 enables control of amplitude branching ratio K, thus making it possible to perform modulation of light wave signals. Also this optical modulator can be used as an optical switch or an optical attenuator that attenuates the intensity of output light in accordance with the applied voltage to EO effect layer 130.

In the optical modulator of the present embodiment, since amplitude branching ratio K is varied by applying voltage to EO effect layer 130 arranged between the core of ring-type optical waveguide 3 and the core of branch optical waveguide 7A, it is possible to vary amplitude branching ratio K greatly with a relatively low voltage if material presenting a large EO effect is used for EO effect layer 130. As a result, it is possible to achieve distinct modulation in the output light even when a modulation signal with a small voltage variation is used. Further, since it is possible to use a quartz optical waveguide structure for each waveguide, it is possible to perform modulation of light with relative short wavelengths such as visible light.

Fourth Embodiment

Figure 10:
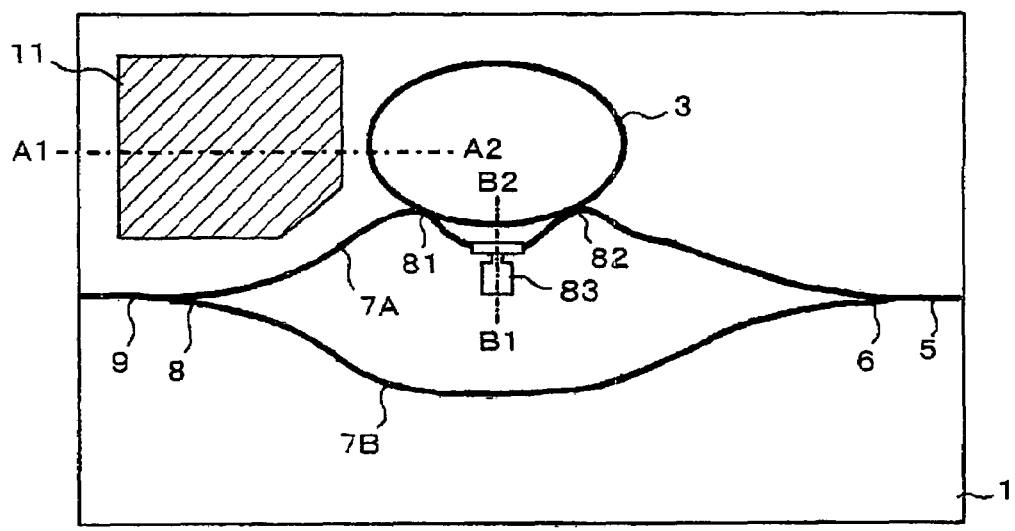
FIG. 10 is a schematic plan view showing a configuration of an optical modulator according to a fourth embodiment of the present invention.

Next, an optical modulator according to a fourth embodiment of the present invention will be described. FIG. 10 shows an optical modulator of the fourth embodiment.

Similarly to the optical modulator of the first embodiment, this optical modulator has input optical waveguide 9 which receives a light wave signal from its one end, splitter 8 connected to the other end of input optical waveguide 9, a pair of branch optical waveguides 7A, 7B, combiner 6 which combines light wave signals having passed through the two branch optical waveguides 7A, 7B, output optical waveguide 5 for outputting the light wave signal that was combined at combiner 6, and ring-type optical waveguide 3, all formed on one planar surface on top of silicon substrate 1. The difference of this optical modulator from the first embodiment is that ring-type optical waveguide 3 is coupled with one branch optical waveguide 7A at two places, that is, two sets of MMI (multi-mode interference) 3 dB optical couplers 81, 82 arranged a short distance apart while phase modulating portion 83 is inserted in branch optical waveguide 7A. Phase modulating portion 83 is disposed at the mid position between the inserted points of two 3 dB optical couplers 81, 82 in branch optical waveguide 7A. As phase modulating portion 83, an arrangement that causes a phase delay to the light wave signal that propagates through branch optical waveguide 7A by plasma effect generated by pn junctions or pin junctions is preferably used. In this configuration, two 3 dB couplers 81, 82 and phase modulating portion 83 optically couple branch optical waveguide 7A and ring-type optical waveguide 3. This optical coupling allows branch optical waveguide 7A and ring-type optical waveguide 3 to be handled as being mode-coupled, hence it is possible to define amplitude branching ratio K between the two optical waveguides in the same manner as the above embodiments. In this configuration, the aforementioned amplitude branching ratio K is varied by adjusting the amount of phase delay at phase modulating portion 83. In this case, the change of phase delay as a ring resonance type phase shifter, caused by the change of amplitude branching ratio K is enlarged by 10 times or greater, compared to the change in phase delay caused by phase modulating portion 83 only. As a result, phase modulating portion 83 to be inserted into branch optical waveguide 7A can be made small in size.

Figure 11:
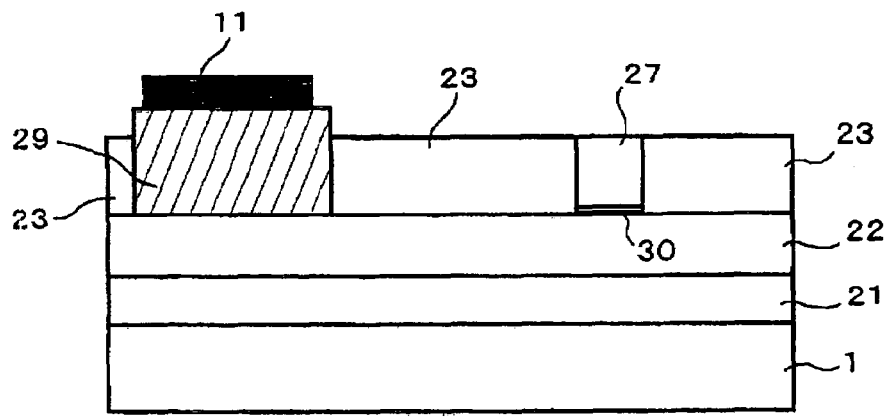
FIG. 11 is a sectional view, cut along line A1-A2 in FIG. 10.
Figure 12:
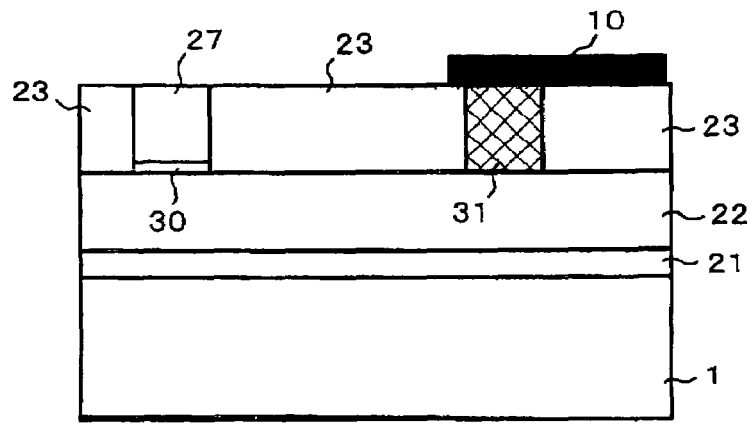
FIG. 12 is a sectional view, cut along line B1-B2 in FIG. 10.

FIG. 11 shows a section cut along A1-A2 in FIG. 10, and FIG. 12 shows a section cut along B1-B2 in FIG. 10. Similarly to the first embodiment, $SiO_2$ film 21 and n-type silicon layer 22 are formed successively on silicon substrate 1. On the upper surface of n-type silicon layer 22, ring-type optical waveguide 3 and branch optical waveguides 7A, 7B are formed as ridge optical waveguides of p-type silicon. In the illustration, Si core layer 27 is provided correspondingly to ring-type optical waveguide 3. In branch optical waveguide 7A, the part corresponding to phase modulating portion 83 is formed of p-type polysilicon layer 31 as shown in FIG. 12. In order to electrically separate Si core layer 27 of ring-type optical waveguide 3 from n-type silicon layer 22, $SiO_2$ film 30 is provided at the interface between the two. In phase modulating portion 83, p-type polysilicon layer 31 forms a pn junction with n-type silicon layer while cathode electrode 10 is formed in connection with p-type polysilicon layer 31. Both sides of Si core layer 27 and p-type polysilicon layer 31 are filled with $SiO_2$ film 23. Further, n-type polysilicon layer 29 and anode electrode 11 for voltage application are successively laminated over a portion of n-type silicon layer 22.

In this optical modulator, as a voltage is applied between anode electrode 11 and cathode electrode 10, the light wave signal propagating through p-type polysilicon layer 31 is caused to delay in phase by plasma effect in the pn junction made up of p-type polysilicon layer 31 as a part of the ridge optical waveguide or branch optical waveguide 7A and n-type silicon layer 22 located therebelow. This phase delay causes a change in amplitude branching ratio K between ring-type optical waveguide 3 and branch optical waveguide 7A as mentioned above, to thereby cause a large phase delay to the light wave signal propagating through branch optical waveguide 7A. Since amplitude branching ratio K is varied by changing the applied voltage between anode electrode 11 and cathode electrode 10, this feature of the present embodiment makes it possible to perform modulation of light wave signals. The optical modulator of the present invention as well can also be used as an optical switch or an optical attenuator that attenuates the intensity of output light in accordance with the voltage applied between cathode electrode 10 and anode electrode 11.

Figure 13A:
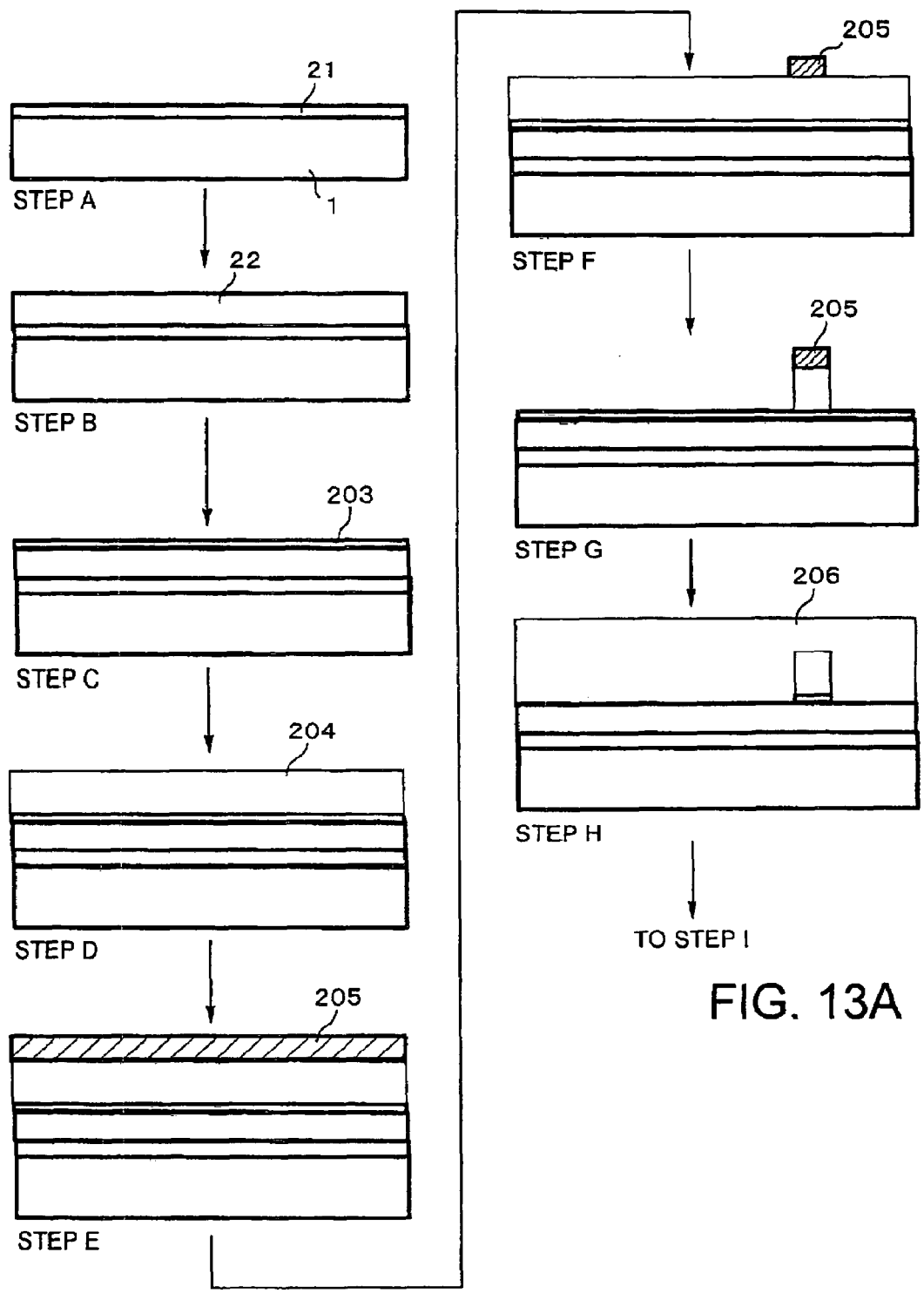
FIGS. 13A and 13B are views showing a method of manufacturing the optical modulator of the fourth embodiment.
Figure 13B:
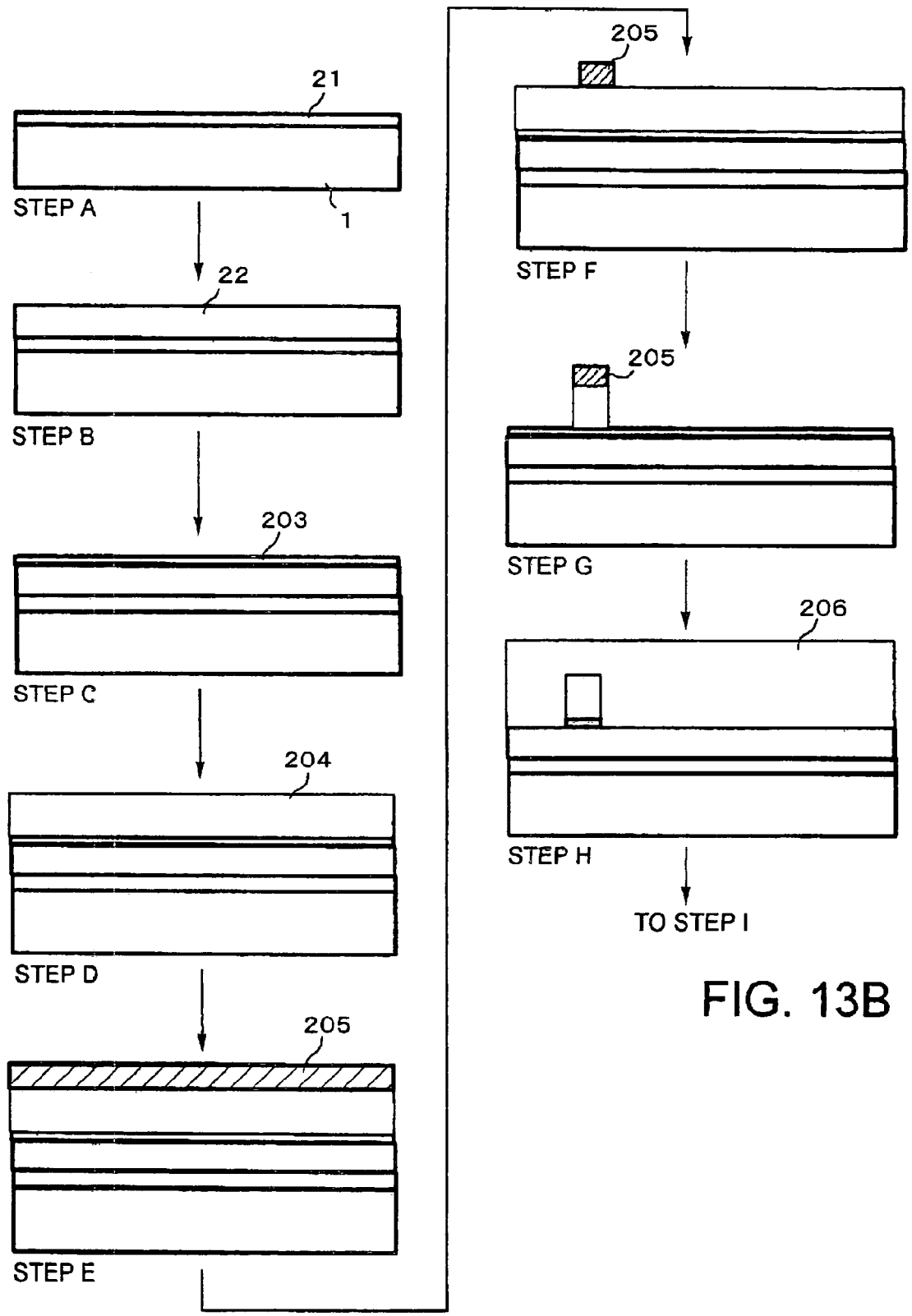
Figure 14A:
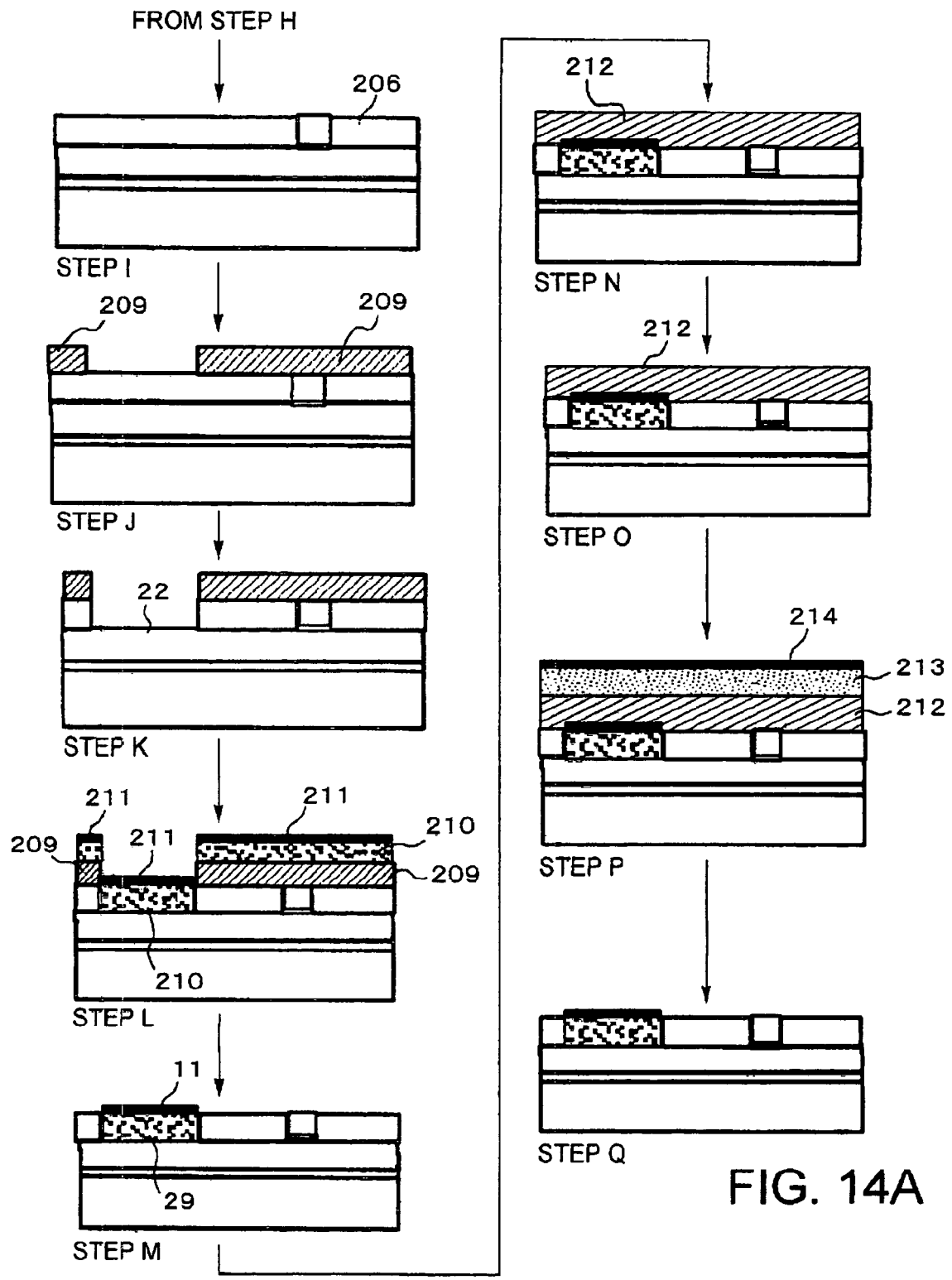
FIGS. 14A and 14B are views showing the method of manufacturing the optical modulator of the fourth embodiment.
Figure 14B:
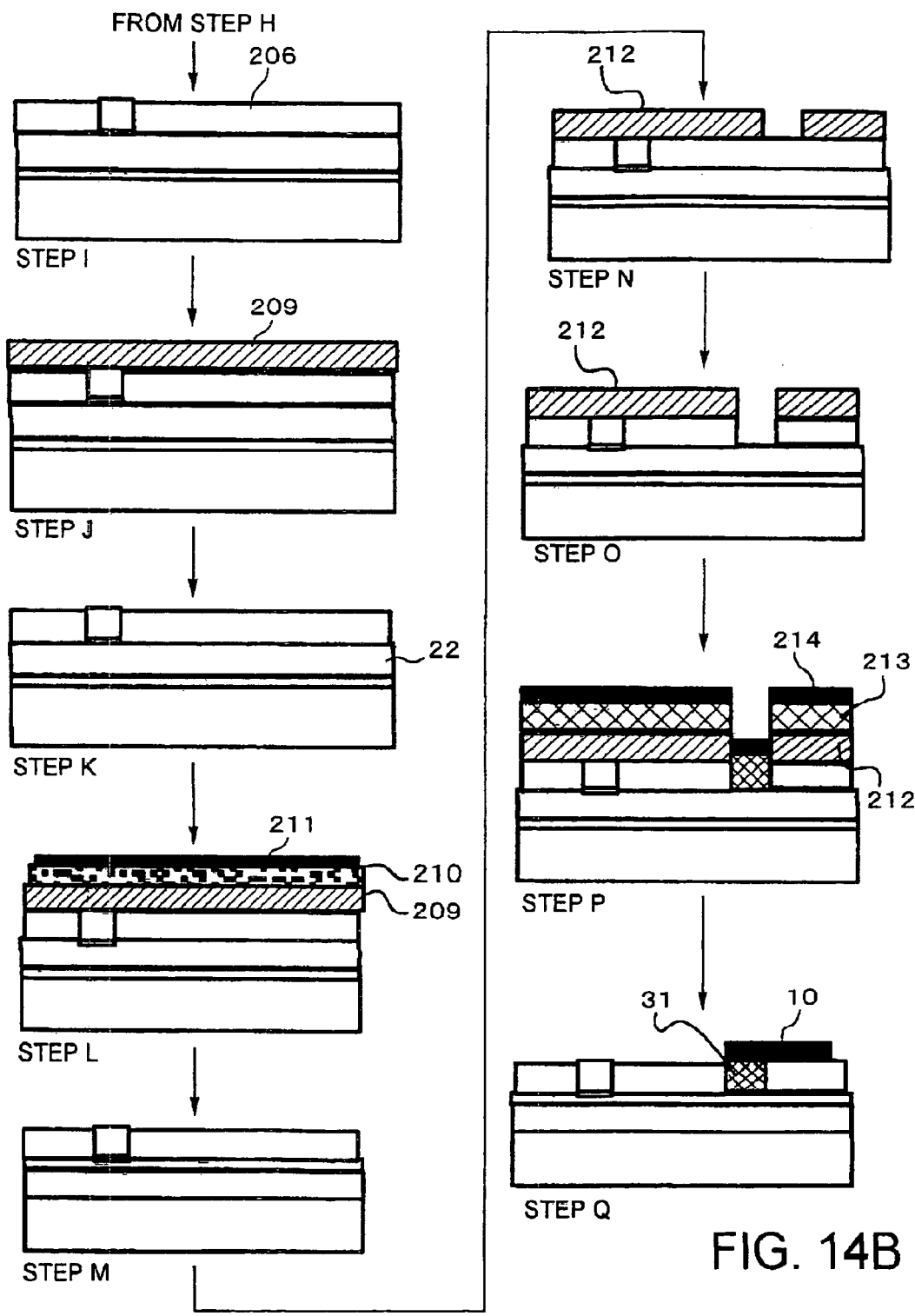

Next, the fabrication process of the optical modulator shown in FIGS. 10 to 12 will be explained with reference to FIGS. 13A, 13B, 14A and 14B. FIGS. 13A and 14A correspond to the sections cut along line A1-A2 in FIG. 10, and FIGS. 13B and 14B correspond to the sections cut along line B1-B2 in FIG. 10, To begin with, at Step A, an SOI substrate that is silicon substrate 1 on which $SiO_2$ layer 2 is laminated is used. At Step B, n-type silicon layer 22 is laminated on the upper surface of the SOI substrate. At Step C, thin $SiO_2$ film 203 is formed over n-type silicon layer 22. At Step D, silicon layer 204 is laminated over $SiO_2$ film 203. At Step E, photosensitive resist film 205 is applied over silicon layer 204. Then, at Step F, photosensitive resist film 205 is patterned to form optical waveguide pattern 205. Thereafter, p-type silicon layer 204 masked by optical waveguide pattern 205 or photosensitive resist film 205 is etched using an RIE (reactive ion etching) process so as to form a ridge waveguide (i.e., Si core layer 27) to be ring-type optical waveguide 3 at Step G. Though not illustrated in the drawing, ridge waveguides to be branch optical waveguides 7A, 7B are also formed at the same time. The optical waveguide portion which is to be the phase modulating portion is not formed at this point.

Thereafter, optical waveguide pattern 205 is removed, and $SiO_2$ film 206 is laminated over n-type silicon layer 22 and Si core layer 27 at Step H. At Step I, the whole of $SiO_2$ film 206 is uniformly etched by an RIE process until the top portion of the ridge optical waveguide is exposed. At Step J, resist mask pattern 209 for forming anode electrode 11 is formed. At Step K, $SiO_2$ film 206 masked with resist mask pattern 209 is uniformly etched by an RIE process until a portion of n-type silicon layer 22 is exposed. Then, at Step L, n-type polysilicon layer 210 and metal electrode layer 211 are laminated over n-type silicon layer 22 and resist mask pattern 209. At Step M, a lift-off process for removing resist mask pattern 209 with an organic solvent or the like is performed to form n-type polysilicon layer 29 and anode electrode 11.

Next, at Step N, resist mask pattern 212 for forming the optical waveguide in the phase modulating portion is formed. At Step O, $SiO_2$ film 206 masked with resist mask pattern 212 is uniformly etched by dry etching such as an RIE process until a portion of n-type silicon layer 22 is exposed. Then, at Step P, p-type polysilicon layer 213 and metal electrode layer 214 are laminated over n-type silicon layer 22 and resist mask pattern 209. At Step Q, a lift-off process for removing resist mask pattern 209 with an organic solvent or the like is performed to form n-type polysilicon layer 31 which constitutes the optical waveguide at the position of the phase modulating portion and cathode electrode 10 on n-type polysilicon layer 31.

With the above steps, the optical modulator of the fourth embodiment is completed.

Figure 15:
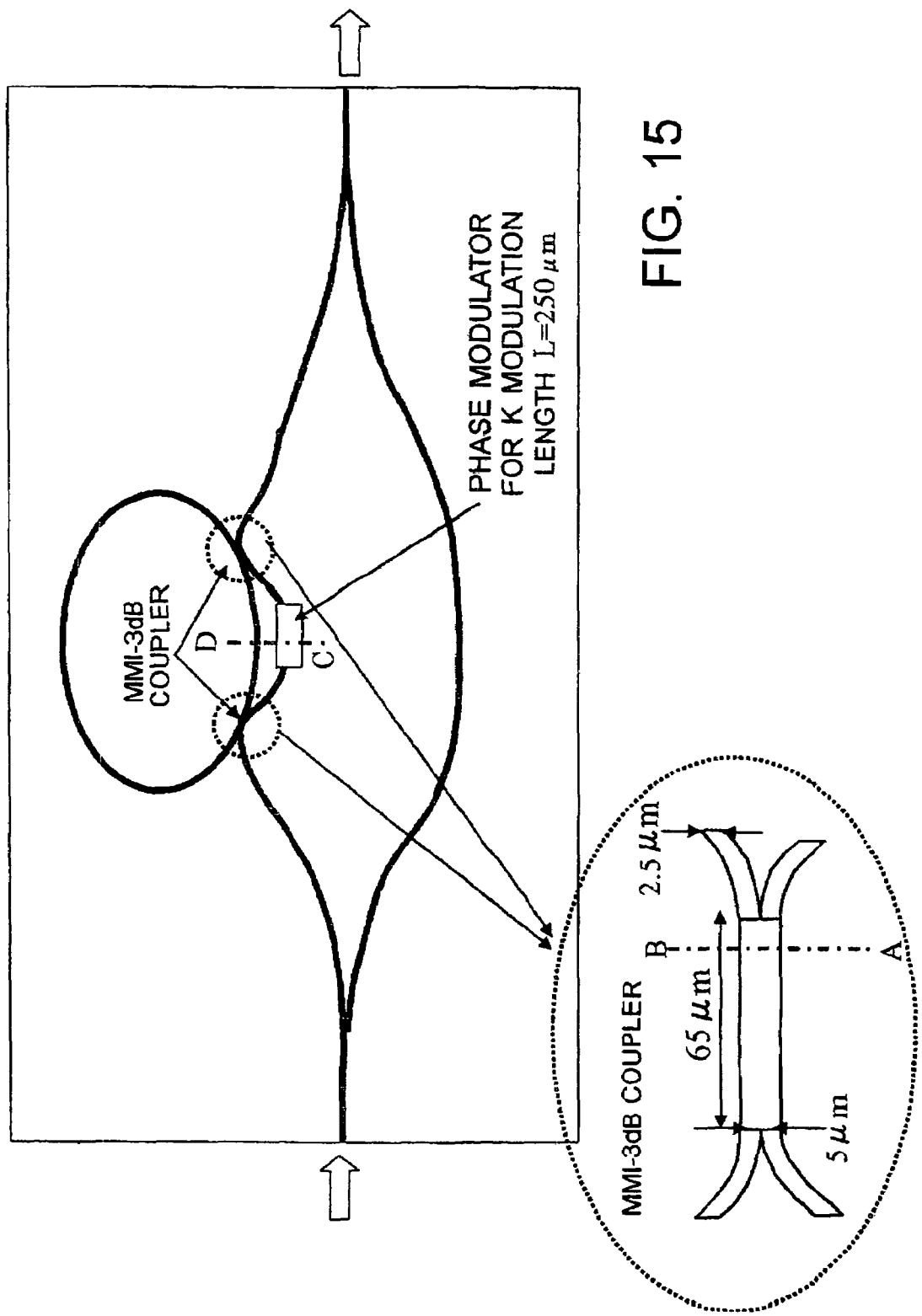
FIG. 15 is a view showing a specific example of the optical modulator of the fourth embodiment.
Figure 16A:
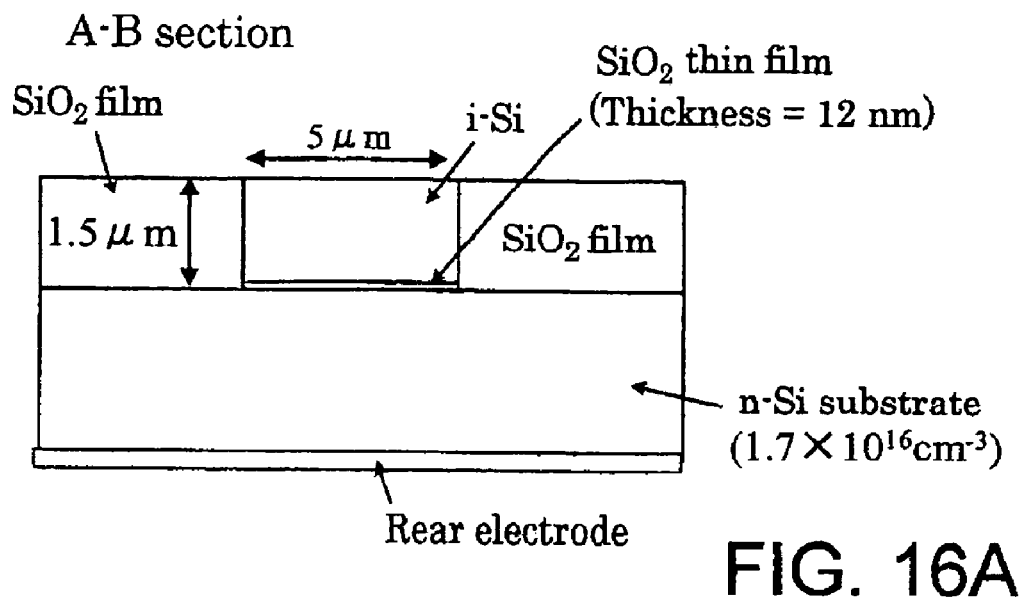
FIGS. 16A and 16B are sectional views of the optical modulator shown in FIG. 13.
Figure 16B:
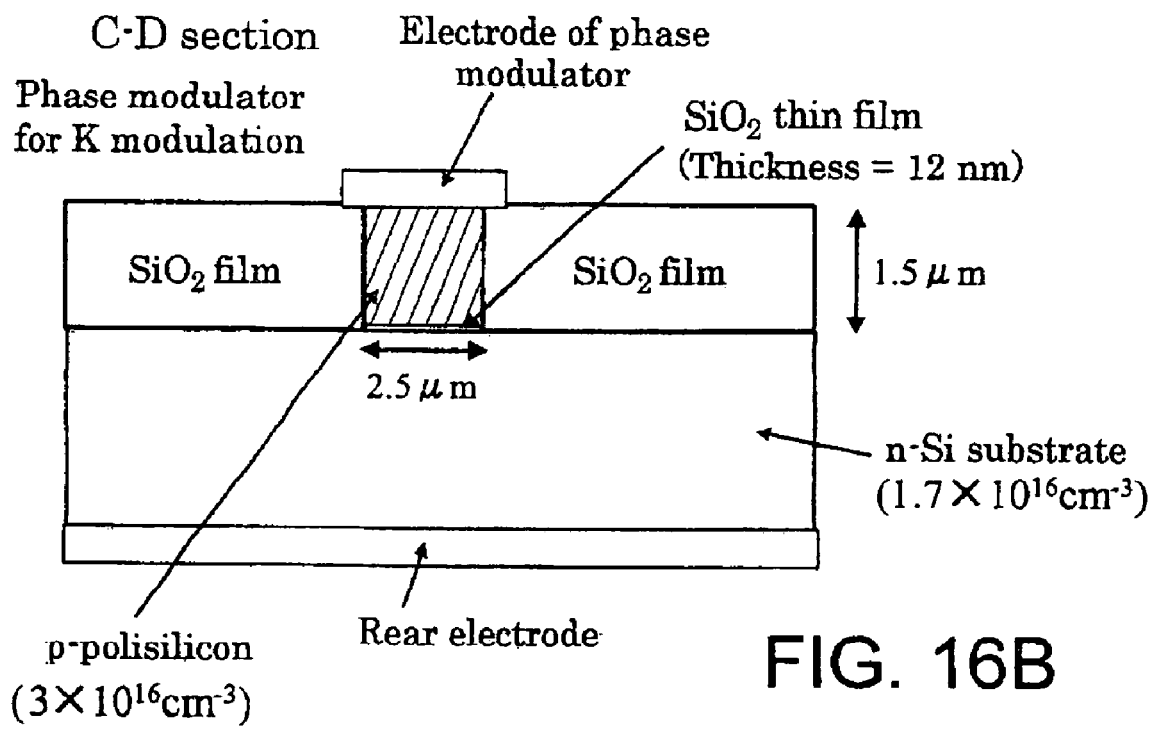

FIGS. 15, 16A and 16B show a specific configurational example of this optical modulator. FIG. 15 is a plan view, FIG. 16A shows a section along line A-B in FIG. 15, and FIG. 16B shows a section along line C-D in FIG. 15. Here, a configuration in which a cathode electrode is provided as a rear electrode formed on the underside of an n-type silicon (Si) substrate will be explained.

In this configuration, core portions of branch optical waveguide 7A and ring-type optical waveguide 3 are each formed of i-type silicon or p-type polysilicon (with an impurity concentration of $3 \times 10^{16}$ cm$^{-3}$) of 2.5 μm wide and 1.5 μm thick. As each of 3 dB couplers 81, 82 of MMI type, an optical coupler of 65 μm long and 5 μm wide is used. The thus constructed branch optical waveguide 7A and ring-type optical waveguide 3 are formed over an n-type silicon substrate (with an impurity concentration of $1.7 \times 10^{16}$ cm$^{-3}$) having a rear electrode formed on the underside thereof. The optical path length of phase modulating portion 83 of branch optical waveguide 7A is 250 μm. In the position of phase modulating portion 83, electrode 10 is formed on the upper face of the core of branch optical waveguide 7A consisting of p-type polysilicon.

Figure 17:
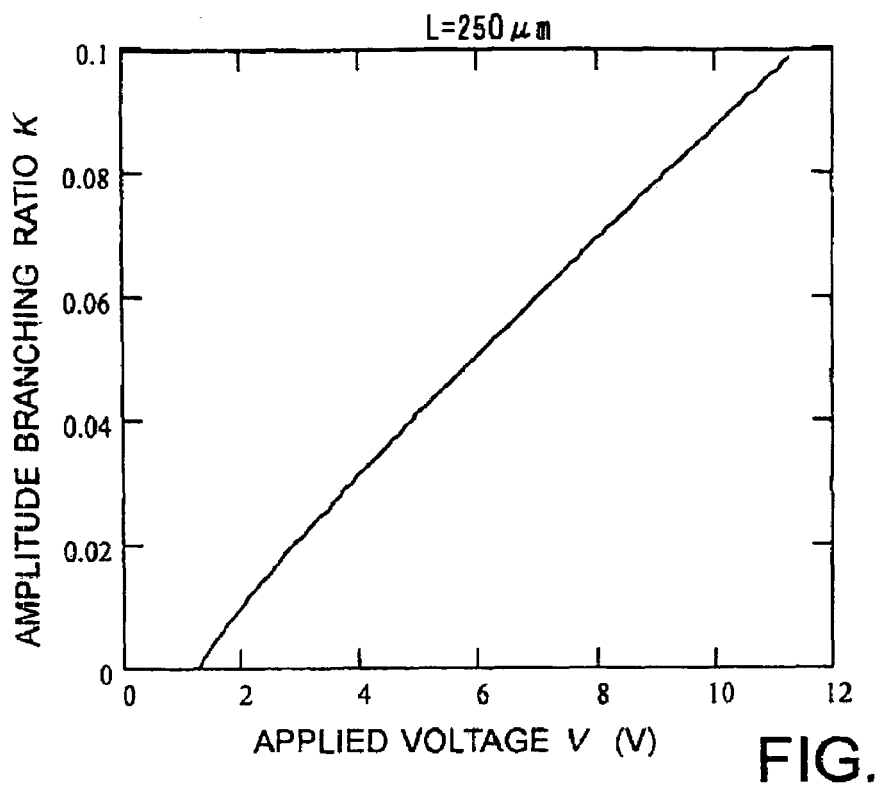
FIG. 17 is a graph showing the relationship between the applied voltage and the amplitude branching ratio.

FIG. 17 shows the relationship between voltage V and amplitude branching ratio K in the optical modulator shown in FIGS. 15, 16A and 16B where V represents the voltage applied between electrode 10 and the rear electrode. When the optical length of phase modulating portion 83 is assumed to be 250 μm, K can be varied in a range from 0 to 0.1 by varying applied voltage V by about 10 V. As described also in the first embodiment, since a phase difference of 0 to approximately π can be produced as K is varied in a range from 0 to 0.1, it is possible to realize an optical modulator presenting a sufficient extinction ratio, using a phase modulating portion having an optical length of 250 μm. This phase modulating portion operates based on the change in refractive index by voltage application. The aforementioned optical modulator proposed by Liu et al., also performs optical modulation based on the change in refractive index by voltage application, but the modulator of Liu et al. needs an optical length on the order of millimeters in order to obtain the same extinction ratio as that of the present embodiment. In other words, the present embodiment makes it possible to downsize the electrode used for the phase modulating portion to one-tenth or smaller, so the parasitic capacitance can be reduced to one tenth, which enables high speed modulation of light wave signals.

In the optical modulator of the fourth embodiment, ring-type optical waveguide 3 and branch optical waveguide 7A are coupled using two 3 dB couplers 81, 82 instead of arranging these waveguides close to each other to be mode-coupled. Therefore, this configuration looks complicated but is unlikely to be affected by manufacturing errors. Therefore, according to the fourth embodiment, it is possible to produce optical modulators having stable characteristics in large quantities.

Fifth Embodiment

Figure 18:
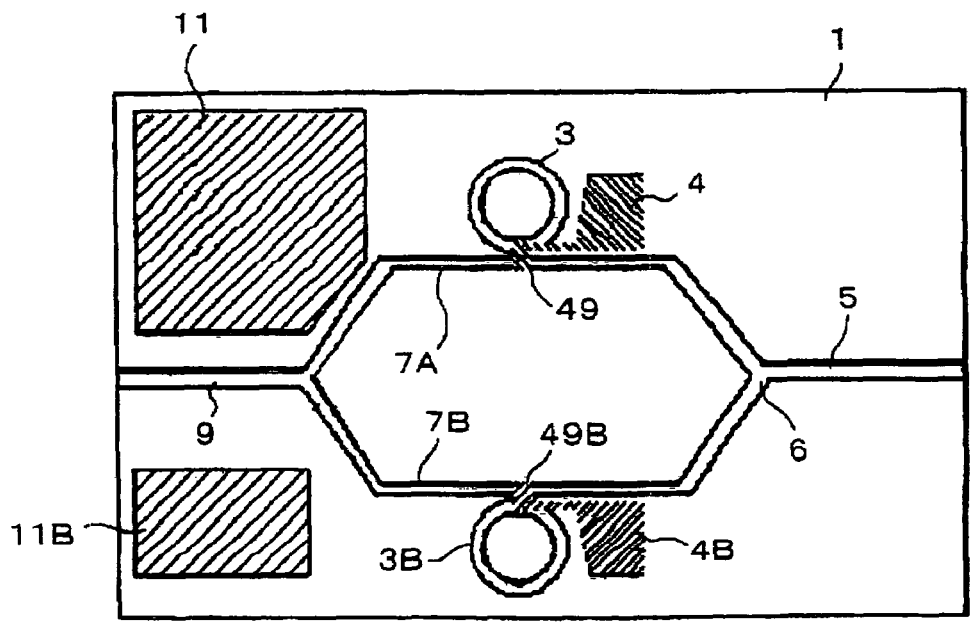
FIG. 18 is a schematic plan view showing a configuration of an optical modulator according to a fifth embodiment of the present invention.

Next, as a fifth embodiment of the present invention, an optical modulator capable of being driven at low voltage by push-pull operation will be described. FIG. 18 shows an optical modulator according to the fifth embodiment. This optical modulator is the same as the modulator of the first embodiment described above, except in that, of paired branch optical waveguides 7A, 7B, second ring-type optical waveguide 3B is provided for the other branch optical waveguide 7B. Second ring-type optical waveguide 3B in combination with branch optical waveguide 7B constitutes a second ring resonance type phase shifter. In this optical modulator, two branch optical waveguides 7A, 7B have their own ring resonance type phase shifters, respectively. Both ring resonance type phase shifters have the same structure.

That is, cathode electrode 49B, pad electrode 4B, anode electrode 11B are provided on the branch optical waveguide 7B side. Since both anode electrodes 11, 11B are electrically connected to n-type silicon layer 22, it is possible to provide only one anode electrode as anode electrodes 11, 11B.

Next, the operation of this optical modulator will be described. In this optical modulator, a different phase delay can be selected for each of branch optical waveguides 7A, 7B. To begin with, with as a common electrode set up for anode electrodes 11, 11B, a voltage which causes a phase delay of π/2 in each of the branch optical waveguides is set as reference voltage level R for the voltage to be applied to cathode electrodes 49, 49B. When the voltage applied to cathode electrodes 49, 49B are both equal to the reference level, no phase difference occurs between branch optical waveguides 7A, 7B, so that the output light of the maximum intensity can be obtained. To minimize the output light, a voltage that will cause a phase difference of π is applied to one electrode, e.g., cathode electrode 49 while a voltage that will not cause any phase difference is applied to the other, cathode electrode 49B. In terms of the voltage difference from the reference level, both of these voltages are approximately half the voltage difference E that is required to generate phase differences from 0 to π in one of the branch optical waveguides. Accordingly, as the drive circuits for driving cathode electrodes 49, 49B, one of them may have the capability of applying a voltage from R to R+(E/2) while the other may have the capability of applying a voltage from R to R−(E/2). That is, these two drive circuits may have configurations that can apply complementary signals to each other, presenting a potential difference from reference value R as the middle level, which is not more than E/2.

In the present embodiment, a drive circuit that provides a voltage signal having a voltage variation of not more than E/2, in accordance with a modulation signal, can be used for each drive circuit. Accordingly, it is possible to reduce the amplitude of the voltage variation in the signal output from the drive circuit to half, compared to the case where modulation is effected by one of the branch optical waveguides only. In general, in a circuit that varies voltage in accordance with a modulation signal, if the voltage variation width is large, the power consumption increases in proportion to the square of the voltage variation width and it becomes impossible to vary the voltage at high speeds, because of parasitic capacitance existing at diverse sites in the circuit and other problems. In the present embodiment, it is possible to make the voltage variation widths required for individual circuits small, so that it is possible to achieve high-speed operation, and even considering the needs of two drive circuits, the power consumption can be cut down compared to the case where modulation is performed with one of the branch optical waveguides only.

Though the fifth embodiment described above is configured such that the ring resonance type phase shifter is provided for each of the branch optical waveguides in the configuration of the first embodiment, it is also possible to provide configurations in which, in the second to fourth embodiments, the ring resonance type phase shifter of the associated embodiment is provided for each of the branch optical waveguides. In the cases where, in the second to fourth embodiments, the ring resonance type phase shifter is provided for each of the branch optical waveguides, the drive circuits may and should be ones that apply complementary signals with reference to the signal level for the phase delay of π/2 to respective ring resonance type phase shifters.

All the optical functional devices (e.g., optical modulators, optical attenuators, optical switches) of various embodiments of the present invention are ones that are formed on a semiconductor substrate such as a silicon semiconductor substrate or the like by semiconductor device fabricating technologies. Therefore, in the present invention, the drive circuits for driving individual ring resonance type phase shifters and other signal processing circuits may be formed on the silicon semiconductor substrate on which the optical functional device is formed. For example, the drive circuits can be integrated monolithically on the silicon semiconductor substrate as CMOS LSI circuits.

What is claimed is:

1. An optical functional device comprising:
an input optical waveguide for receiving input of a light wave signal;
first and second branch optical waveguides;
a splitter connected to said input optical waveguide to branch said light wave signal into two parts to be routed to said first and second branch optical waveguides;
an optical modulating unit provided for, at least, one of said first and second branch optical waveguides to modulate the light wave signal that propagates through a corresponding branch optical waveguide for which said optical modulating unit is provided;
a combiner for recombining the light wave signals from said first and second branch optical waveguides; and
an output optical waveguide for outputting the combined light wave signal,
wherein said optical modulating unit comprises:
a ring-type optical waveguide disposed so as to be optically coupled to the corresponding branch optical waveguide; and
a means for varying an amplitude branching ratio between the corresponding branch optical waveguide and said ring-type optical waveguide,
wherein said means for varying the amplitude branching ratio comprises:
two couplers inserted in series in the corresponding branch optical waveguide, and
a phase modulating unit disposed between said two couplers and inserted in the corresponding branch optical waveguide for varying a phase of the light wave signal that propagates through the corresponding branch optical waveguide,
wherein the corresponding branch optical waveguide and said ring-type optical waveguide are coupled at positions of said couplers through the corresponding couplers.

2. The device according to claim 1, wherein in said optical modulating unit, both refractive indexes of the corresponding branch optical waveguide and said ring-type optical waveguide at a site where the corresponding branch optical waveguide and said ring-type optical waveguide are optically coupled are varied so as to change said amplitude branching ratio.

3. The device according to claim 1, wherein in said optical modulating unit, one of refractive indexes of the corresponding branch optical waveguide and said ring-type optical waveguide at a site where the corresponding branch optical waveguide and said ring-type optical waveguide are optically coupled is varied so as to change said amplitude branching ratio.

4. The device according to claim 1, wherein said means for varying the amplitude branching ratio comprises:

a pn junction or pin junction formed in the corresponding branch optical waveguide and/or said ring-type optical waveguide, at a site where the corresponding branch optical waveguide and said ring-type optical waveguide are optically coupled; and
a means for applying voltage to said pn junction or pin junction.

5. The device according to claim 1, wherein said means for varying the amplitude branching ratio comprises: a means for varying temperature at a site where the corresponding branch optical waveguide and said ring-type optical waveguide are optically coupled.

6. The device according to claim 1, wherein said means for varying the amplitude branching ratio comprises:
an electro-optic effect device disposed between the corresponding branch optical waveguide and said ring-type optical waveguide, at a site where the corresponding branch optical waveguide and said ring-type optical waveguide are optically coupled; and
a means for applying voltage to the electro-optic effect device.

7. The device according to claim 1, wherein said phase modulating unit comprises:
a pn junction or pin junction formed in the branch optical waveguide at the phase modulating unit; and
a means for applying voltage to said pn junction or pin junction.

8. The device according to claim 1, wherein said first and second branch optical waveguides include said optical modulating units, respectively.

9. The device according to claim 1, wherein each of said splitter and combiner has an optical waveguide structure; and each of said input optical waveguide, said splitter, said first and second branch optical waveguides, said combiner, said output optical waveguide and said ring-type optical waveguide is composed of semiconductor material.

10. The device according to claim 1, wherein each of said splitter and combiner has an optical waveguide structure; and said input optical waveguide, said splitter, said first and second branch optical waveguides, said combiner, said output optical waveguide and said ring-type optical waveguide are formed on a silicon semiconductor substrate.

11. The device according to claim 10, wherein a drive circuit for driving said optical modulating unit is integrated monolithically on said silicon semiconductor substrate.

12. The device according to claim 4, wherein said means for varying the amplitude branching ratio applies voltage to said pn junction or pin junction in accordance with a modulation signal for modulating an input light wave signal.

13. The device according to claim 6, wherein said means for varying the amplitude branching ratio applies voltage to said electro-optic effect device in accordance with a modulation signal for modulating an input light wave signal.

14. The device according to claim 5, further comprising:
a heater for varying the temperature of the corresponding branch optical waveguide and/or said ring-type optical waveguide, at the site where the corresponding branch optical waveguide and said ring-type optical waveguide are optically coupled, wherein said heater is driven with an amount of electric current in accordance with a target amount of attenuation between the input light wave signal and output light wave signal.

* * * * *